United States Patent [19]
Von Haas et al.

[11] Patent Number: 5,697,740
[45] Date of Patent: Dec. 16, 1997

[54] CHUCKING FIXTURE FOR CONNECTING A TOOL HEAD AND A TOOL HOLDER TO MACHINE TOOLS

[75] Inventors: Rainer Von Haas, Geesthacht; Hans Tack, Velbert; René Huchon, Düsseldorf, all of Germany

[73] Assignee: Widia GmbH, Essen, Germany

[21] Appl. No.: 649,653

[22] PCT Filed: Nov. 8, 1994

[86] PCT No.: PCT/DE94/01337

§ 371 Date: Jun. 10, 1996

§ 102(e) Date: Jun. 10, 1996

[87] PCT Pub. No.: WO95/13893

PCT Pub. Date: May 26, 1995

[30] Foreign Application Priority Data

Nov. 15, 1993 [DE] Germany ............... 43 38 953.8

[51] Int. Cl.$^6$ ..................... B23B 31/02
[52] U.S. Cl. ............ 409/234; 82/160; 279/905; 279/2.23; 408/240
[58] Field of Search ............. 82/160; 409/234; 279/905, 2.19, 2.23, 71, 81; 408/240, 239 R, 239 A, 238

[56] References Cited

U.S. PATENT DOCUMENTS

| | | | |
|---|---|---|---|
| 4,626,146 | 12/1986 | Neumaier | 408/239 R |
| 4,723,877 | 2/1988 | Erickson | 409/234 |
| 4,726,268 | 2/1988 | Erickson | 82/36 B |
| 4,736,659 | 4/1988 | Erickson | 409/234 |
| 4,747,735 | 5/1988 | Erickson et al. | 409/234 |
| 4,932,295 | 6/1990 | Erickson | 82/160 |
| 4,981,057 | 1/1991 | Von Haas et al. | 82/160 |
| 5,011,346 | 4/1991 | Pfalzgraf | 409/234 |
| 5,173,017 | 12/1992 | Oshnock et al. | 409/234 |
| 5,261,302 | 11/1993 | Erickson et al. | 82/160 |
| 5,279,194 | 1/1994 | Armbrust | 82/160 |
| 5,324,145 | 6/1994 | Kleine | 408/240 |
| 5,427,481 | 6/1995 | Selb et al. | 408/240 |
| 5,529,445 | 6/1996 | Obermeier et al. | 408/240 |

FOREIGN PATENT DOCUMENTS

| | | |
|---|---|---|
| 0 369 211 B1 | 5/1990 | European Pat. Off. . |
| 33 44 467 A1 | 6/1985 | Germany . |
| 35 24 739 A1 | 2/1986 | Germany . |
| 38 37 007 A1 | 5/1990 | Germany . |
| WO 93/09902 | 5/1993 | WIPO . |

Primary Examiner—Daniel W. Howell
Assistant Examiner—Christopher Kirkman
Attorney, Agent, or Firm—Herbert Dubno

[57] ABSTRACT

A clamping device for connecting a toolhead and a toolholder on machine tools using a cylindrical or at least partly conical location hole with corresponding shank, wherein a rotatable clamping bolt with spiral guides is used, in clamping to move clamping members outwards from within, thus providing a positive and non-positive locking of the toolhead and the toolholder. The clamping bolt has at least one stop to limit the angle of rotation in clamping. The retainer for the clamping members is spring mounted in the toolholder.

7 Claims, 4 Drawing Sheets

CHUCKING FIXTURE FOR CONNECTING A TOOL HEAD AND A TOOL HOLDER TO MACHINE TOOLS

CROSS REFERENCE TO RELATED APPLICATIONS

This application is a national phase of PCT/DE 94 01 337 filed 8 Nov. 1994 and based, in turn, upon German national application P43 38 953.8 of 15 Nov. 1993 under the International Convention.

The invention relates to a chucking fixture for connecting a tool head and a tool holder to a machine tool via a cylindrical or at least partially conical location hole and a correspondingly shaped centering pin, wherein chucking elements can be moved from the inside to the outside of recesses during the chucking process by means of a rotatable chucking shaft equipped with helical guides, whereby the tool head and the tool holder can be secured by means of friction and positive interlocks.

BACKGROUND OF THE INVENTION

A chucking fixture of the type described is disclosed in EP 0 369 211 B1. Only a very short chuck travel is required for chucking, whereby the travel of the chucking elements is initially relatively large due to a steep inclination of the chucking cams, while the high chucking forces required are applied in a second, substantially flatter portion of the chuck cam.

DE 35 24 739 A1 discloses a chucking fixture with a conical shank for a tool holder, which tool holder is detachably arranged in a conical location hole of a tapered socket fastened in a chucking cylinder. The location hole has a groove into which balls can be inserted as chucking elements by means of a pull ring to which an axial pressure can be applied, this ring being arranged slidably in a tapered socket. A stop ring is located at the back section of the tapered socket so that the rear position of the pull ring can be fixed by means of a stud. Between this stop ring and an additional stop ring for the back section of the tie rod, there is a pressure spring for moving the pull ring and the tie rod in axial direction. A ring through which the tie rod can pass and against which the pressure spring is braced serves this purpose. The disadvantage of the above-described fixture is its costly and complex design.

OBJECT OF THE INVENTION

The object of the present invention is to provide a chucking fixture of the type described in the introduction so that even with short chuck travel and a compact design, secure chucking is possible even when the parts of the chucking fixture have dimensions which deviate significantly from the nominal dimensions for which the device is intended.

SUMMARY OF THE INVENTION

This object is achieved by means of a chucking fixture of the type generally described above, but wherein the chucking shaft has at least one stop to limit the angle of rotation during chucking and the holder for the chucking elements is elastically prestressed in the tool holder. Due to this preliminary stress, the holder can deflect axially during chucking, compensating for dimensional irregularities of the parts of the chucking fixture. The stop is a simple means to prevent damaging of the chucking elements, which is always a risk when chucking a tool without the use of a torque wrench or if excessive chucking force is applied.

The holder for the chucking elements is preferably prestressed by means of a tension spring, in particular a Belleville spring washer or packet of Belleville spring washers. Because of their low friction, balls are well-suited for use as chucking elements, which are arranged in a canister as a holder. A compact design can be achieved, when the chucking shaft is located in a bore in the tool holder, oriented radially with respect to the common longitudinal axis of the location hole and the centering pivot in the tool holder.

There are a number of possibilities for the limit stop. The chucking shaft can have a head having a semicircular groove cut into its outside surface, in which groove the pin of the tool holder is guided so that the end faces of the groove represent stops to define the angle of rotation of the chucking shaft. Alternately, the guide of the chucking shaft for the chucking elements can have a dome-shaped trough or troughs whose radius/radii has/have been modified to correspond to the shapes of the chucking elements. As soon as a certain angle of rotation is reached, the ball falls into such a trough, which occurrence can easily be detected by the operator. Under these conditions it is impossible to inadvertently overtorque the chucking shaft.

It is preferable and is also known in principle from the prior art that the holder for the chucking elements can be secured against rotation relative to the tool holder. In one particular embodiment of the invention a pin is used as protection against rotation.

Because tool heads often remain stuck in the tool holder after machining a workpiece, or are fitted in a self-locking manner in the tool holder by means of the design of a conical recess in the centering pivot, it is necessary to use an ejector to remove the tool head. The invention includes a chucking shaft configuration with a second helical guide by means of which the ejector can be actuated.

To reduce chucking time, the guides are restricted to an angle of rotation of 20° to 160°. The angle of rotation is understood as the angle by which the chucking shaft must be rotated to chuck or release the tool head. The guides are appropriately located along the outer surface of the chucking shaft, preferably with an angle of rotation of 115°.

According to another embodiment of the invention, the guides describe a continuous second order or higher three-dimensional curve, whose slope—in relation to the tool chucking process or ejection—steadily decreases, preferably hyperbolically, exponentially or logarithmically. The mentioned embodiments can be used so that by means of a relatively steep inclination of the chucking cam, a slight movement of the chuck at the beginning results in a correspondingly large amount of travel of the chucking elements and the requisite high chucking forces can increase sharply in a subsequent, significantly flatter section. The same applies to ejection, where high forces are required initially, before there is significantly greater chuck travel after overcoming the static friction.

Finally, the recess for the centering pivot of the tool head is realized as a bore or an annular groove for the chucking balls and/or one side surface is realized as a bevel.

According to another embodiment of the invention, the guides have an apex point (dead point) whereby until this point is reached during the chucking process, the chucking elements are displaced increasingly radially outward and when this point is passed, the balls move into chucking position.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
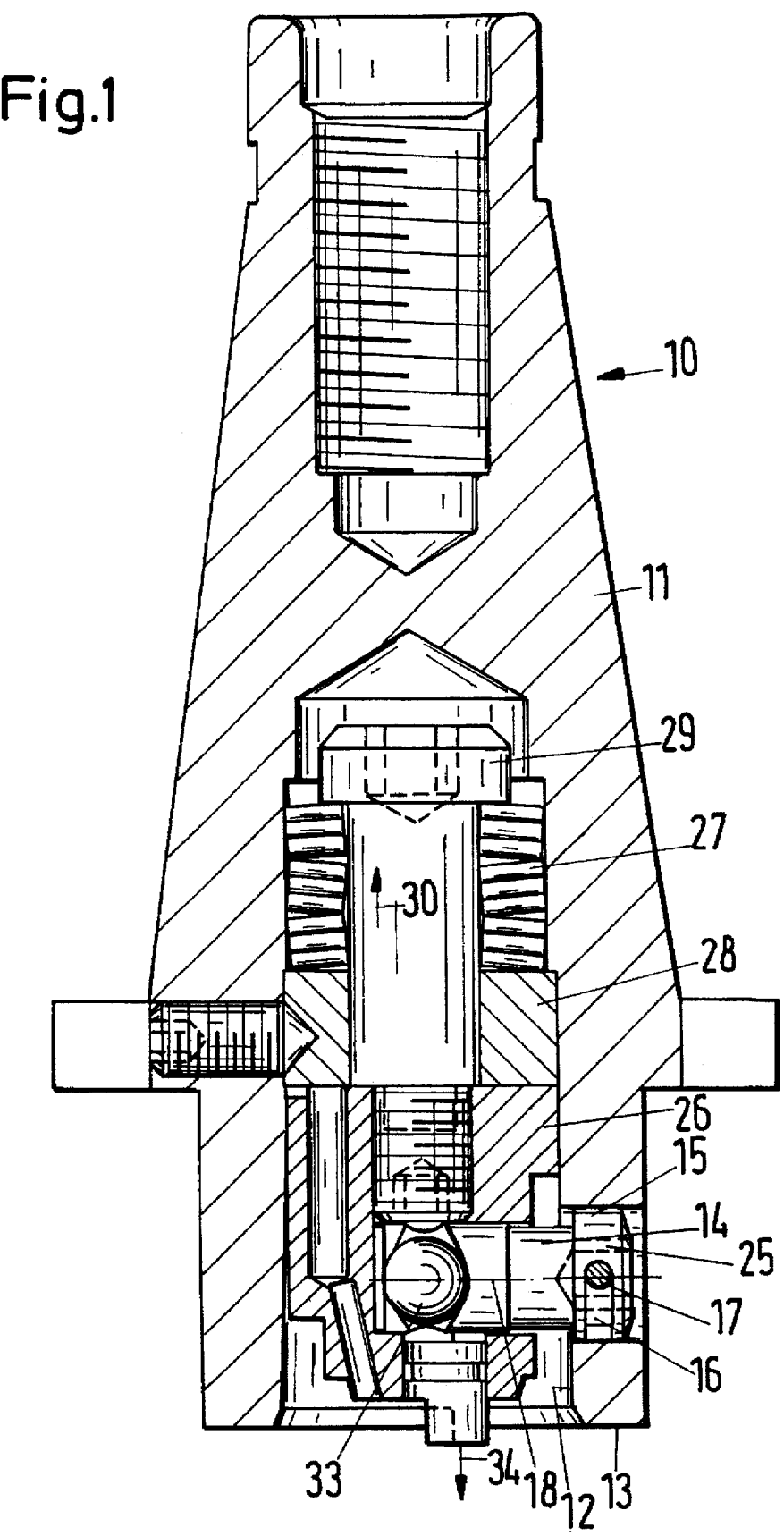
FIG. 1 is a cross section through the tool holder.
Figure 1A:
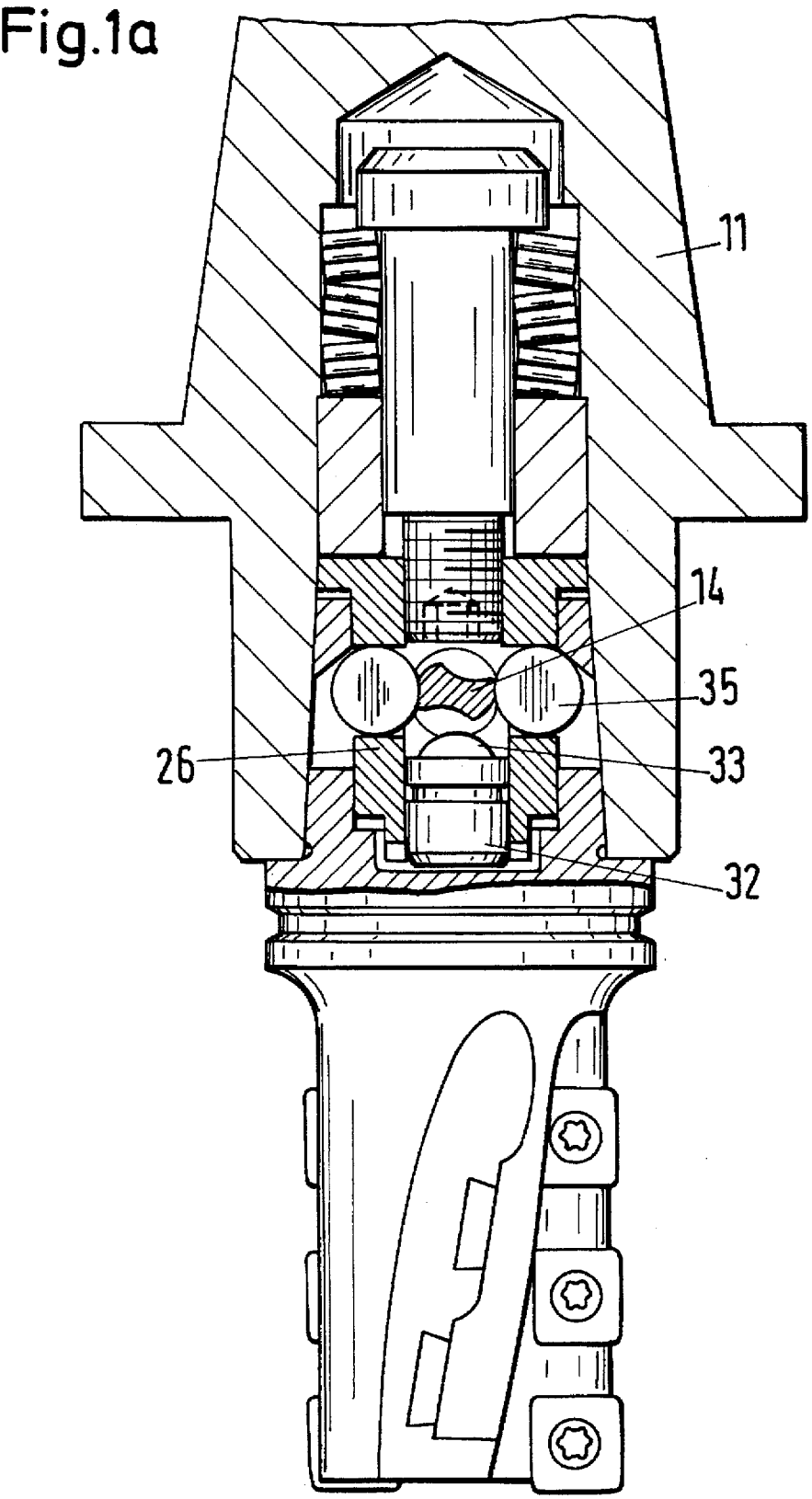
FIG. 1a is a side new partly in section through a tool holder and a tool head.
Figure 2:
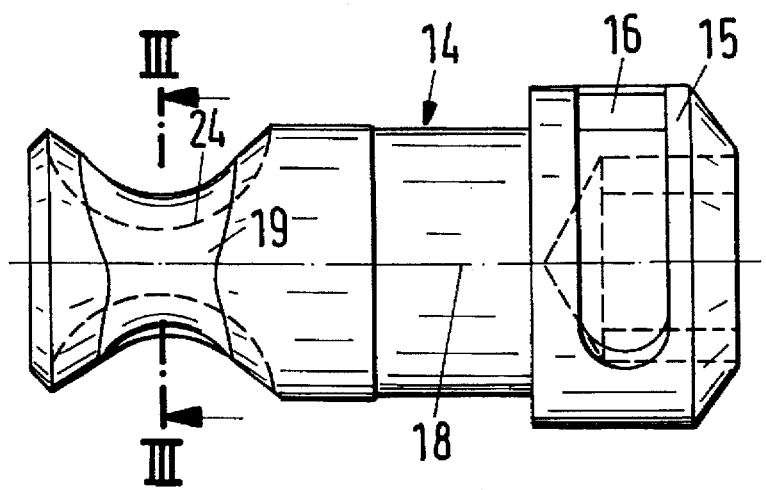
FIG. 2 is a side view of a chucking shaft.

The tool holder 10 shown in FIG. 1 has a conical shaft 11 for mounting on a machine tool, a rotating disk or the like. The tool holder has a conical seating bore, hole or socket 12 in which a correspondingly shaped centering pin of a tool can be inserted. The ring-shaped stop collar of the tool rests at 13 against the tool holder. The chucking fixture consists of a radially oriented chucking shaft 14, which is shown in greater detail in FIGS. 2 and 3. This chucking shaft has a head 15 into whose outer surface a groove 16 extending over an angle of 115° is cut. This groove serves as a guide for a pin 17 connected to the tool holder, whereby the respective end faces of the groove 16 serve as stops to limit the angle of rotation of the chucking shaft 14. The chucking shaft which can be rotated about its longitudinal axis 18 has a spiral chucking and ejection path 19 on its surface, the course of which can be seen in greater detail in FIG. 3. Due to these spiral guides 19, which are essentially second order or higher three-dimensional curves, a short chucking motion will move the chuck a relatively long way at the beginning of chucking, as a result of the relatively steep inclination. 20 indicates the initial position wherein the locating face of the holder is in contact with the corresponding ring-shaped locating face of the tool head. The chucking ball reaches its highest position 22 when the chucking shaft is rotated around the longitudinal axis (see arrow 21) and moves past this point to the chucked position 23, whereby in the last part of the curve, i.e. from position 22 to position 23, the chucking distances are clearly shorter, so that great force can be applied here. When loosened, the chucking balls drop into the recesses 24. The chucking shaft can be actuated by means of a key inserted into hex socket 25. The tool base holder 10 also has a holder, retainer or canister 26 for the chucking balls (not shown), which holder is supported by means of a packet of Belleville spring washers 27, braced on one side against a ring 28 and the head 29 of a screw rigidly connected to the canister 26. The springs 27 exert a tensile force on the holder 26 in the direction of arrow 30.

Figure 3:
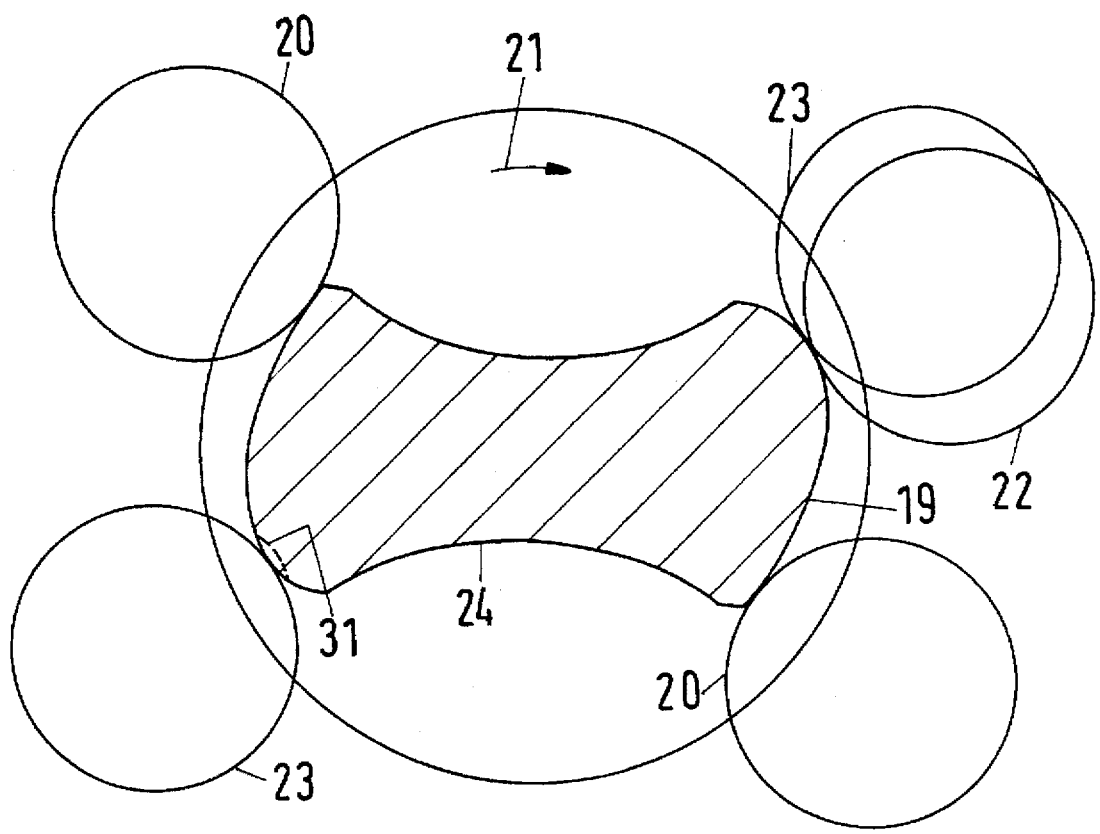
FIG. 3 is a cross section along the line III—III of FIG. 2.

Instead of a stop realized by means of a groove 16 in combination with a pin 17, there can also be a dome-shaped recess 31 in the chucking cam 19, as suggested in the left half of FIG. 3. During chucking the operator notices a significant decrease in the force counteracting the chucking movement as soon as the ball drops into the chucking position in the dome. Therefore the operator can also recognize (i.e. without stops) when the chucking position has been reached.

The advantage of the current invention lies in the fact that the holder 26 can deflect axially against the force of spring 27 during chucking, so that the chucking fixture is protected against damage, even in the event of manufacturing inaccuracies. The dimensional tolerances can therefore be somewhat larger; in some cases, tolerances of up to 5/10 mm are acceptable. By means of the holder 26, to which prestress is applied by means of springs, together with insertion of the chucking shaft 14 in the radial bore of the holder, a compact structure with great stiffness can be accomplished. The spring resistance used depends on the size of the tool holder and can be as high as 4 metric tons. Naturally, a coil spring which engages in a helical groove in the holder 26 and whose free end is rigidly fastened to the body of the tool base holder by means of a bolt or similar fastener, can be used instead of the Belleville spring washers 27.

According to one embodiment of the invention, the chucking and loosening/ejection process can be carried out with only one chucking cam. This is possible only because of the special design of the chucking cam on the chucking shaft and the spherical shape of the ejector.

The axial compliance of the holder (canister) is primarily necessary to ensure that the upper dead point of the chucking cam is reached and passed. The axial displacement of the holder makes it possible to avoid mechanical redundancy.

Figure 4:
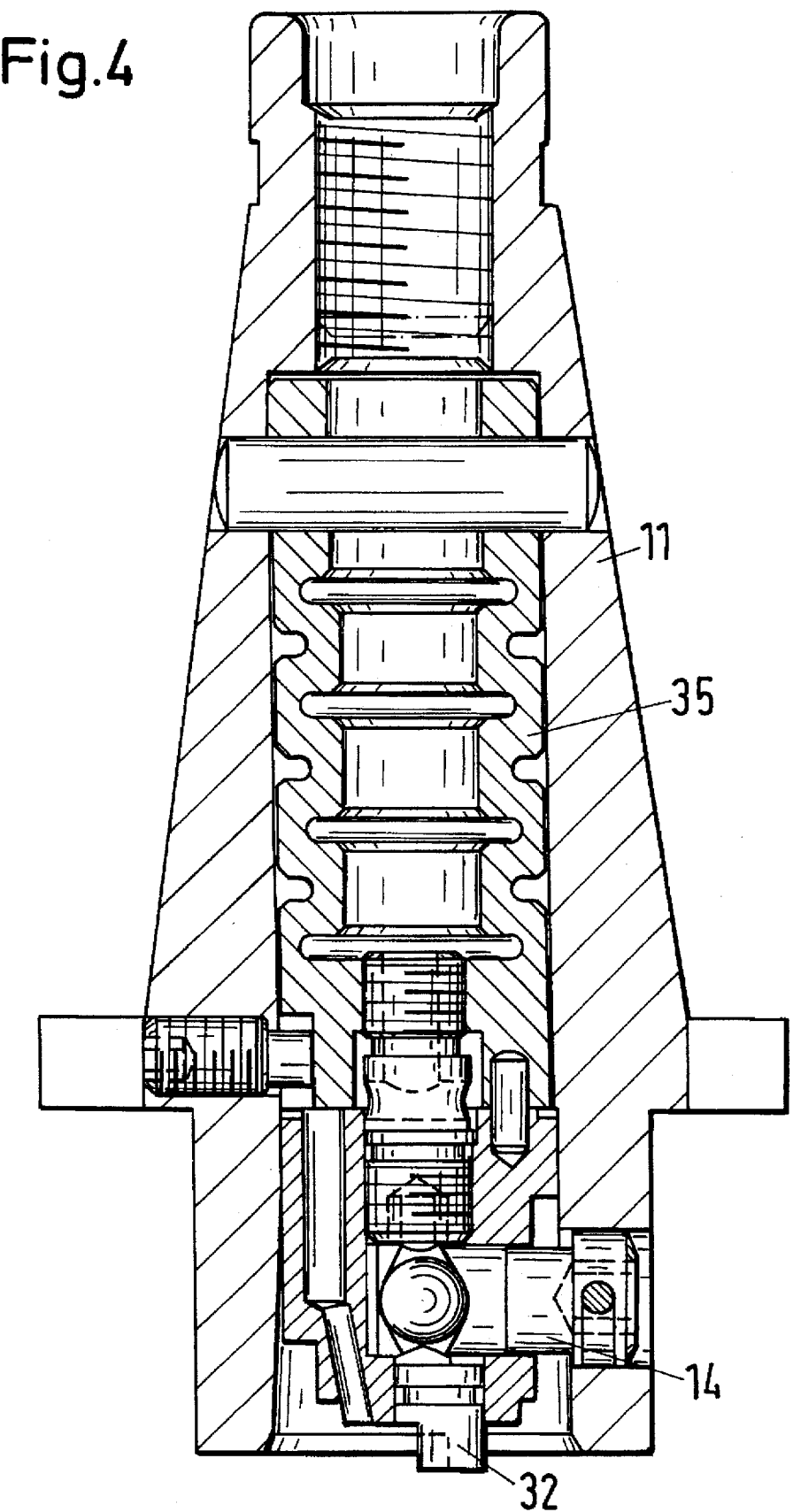
FIG. 4 is a cross section through a tool holder with elastic molded elements.

Also possible are flexible moldings (FIG. 4) which are rigidly connected to the holder (canister) 26 or which form an integral component with the holder.

To relieve the tension or eject the tool head, the chucking shaft 14 is rotated in the direction opposite to the direction indicated by arrow 21, so that the chucking balls are relieved of pressure due to the decreasing inclination of the chucking cams 19 until reaching the end position, defined by a stop in the groove 16 of the head 15, and the balls drop into the recesses 24.

During loosening a somewhat greater amount of torque (release moment) must initially be applied to overcome the highest position of the chucking cam 19. This greater torque simultaneously represents good protection against unintentional loosening of the chuck, such as due to vibrations.

The actual ejection of the tool head is achieved by means of the interaction of the steep portion of the chucking cam 19 shown in the lower left region of FIG. 3 with the spherical compression piece 33 of the ejector 32, when the chucking shaft 14 is rotated in the direction opposite to the direction indicated by arrow 21. As soon as the highest point 22 of the chucking cam 19 passes the compression piece 32 at the spherically shaped end, the compression piece 32 achieves the maximum value for the direction of ejection 34, which is sized so that the tool head is safely ejected.

The guides of the chucking shaft are described in detail in EP 0 369 211 B1 (see also U.S. Pat. No. 4,981,057), to which express reference is made.

We claim:

1. A chucking fixture for connecting a tool body to a machine tool, comprising:
    an elongated tool holder having a longitudinal axis, a shaft at one end receivable in a machine tool and a location hole formed in said tool holder, centered on said axis and open at an opposite end of said tool holder, said location hole being at least partly of conical configuration, whereby a centering pin of a tool body is receivable in and centered in said hole;
    a plurality of chucking elements in said tool holder engageable with said tool body for locking said tool body in said tool holder;
    a retainer in said tool holder and in which said chucking elements are received, said retainer being axially movable in said tool holder toward and away from a mouth of said location hole;

means in said tool holder for elastically prestressing said retainer relative to axial movement in said tool holder;

a chucking shaft extending radially of said longitudinal axis in said tool holder and into said retainer for engagement with said chucking elements, said chucking shaft being rotatable about a radial axis of said tool holder and having spiral guide surfaces for camming said chucking elements outwardly with respect to said longitudinal axis to lock said tool body in said tool holder; and stop means for limiting rotation of said chucking shaft about said radial axis.

2. The chucking fixture defined in claim 1 wherein said means in said tool holder for elastically prestressing said retainer relative to axial movement in said tool holder includes a stack of Belleville spring washers acting upon said retainer.

3. The chucking fixture defined in claim 2 wherein said chucking elements are balls.

4. The chucking fixture defined in claim 3 wherein said chucking shaft has a chucking shaft head, said stop means including an arcuate groove formed in said chucking shaft head and a pin projecting from said tool holder into said arcuate groove.

5. The chucking fixture defined in claim 4, further comprising an ejector movably received in said retainer and engageable against said tool body upon rotation of said chucking shaft to release said tool body.

6. The chucking fixture defined in claim 4 wherein said arcuate groove is constructed and arranged to permit rotation of said chucking shaft through 20° to 160°.

7. The chucking fixture defined in clam 6 wherein said chucking shaft has a pair of spiral camming surfaces separated by recesses receiving said balls for release of said tool body from said tool holder.

* * * * *